Jan. 13, 1931.  J. T. ANDERSON  1,788,759
AUTOMATIC SELF SERVICING DEVICE FOR MERCANTILE STORES
Filed June 24, 1929   3 Sheets-Sheet 1

Jason T. Anderson
INVENTOR

BY
ATTORNEY

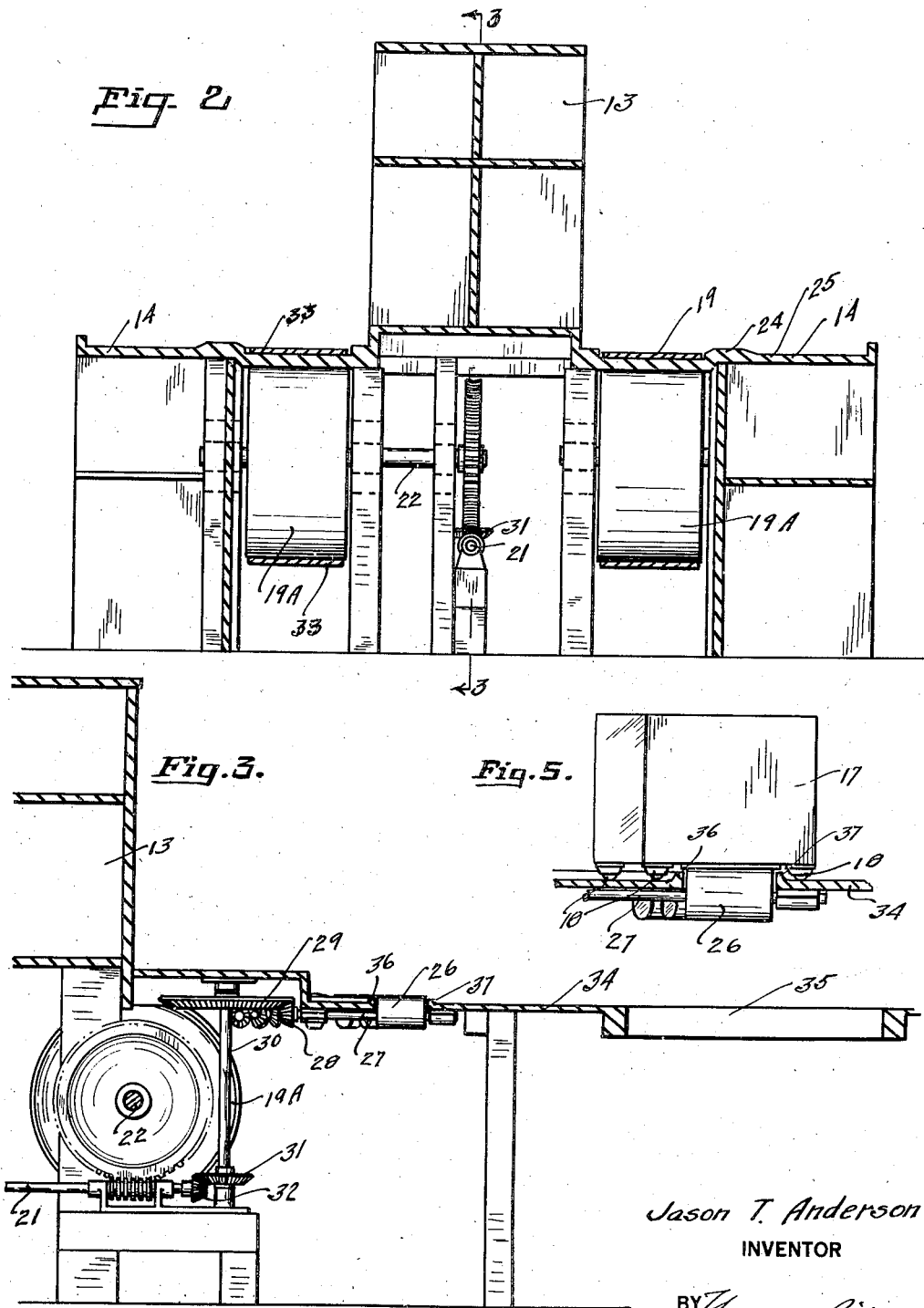

Jan. 13, 1931.   J. T. ANDERSON   1,788,759
AUTOMATIC SELF SERVICING DEVICE FOR MERCANTILE STORES
Filed June 24, 1929    3 Sheets-Sheet 3

Jason T. Anderson
INVENTOR

BY
ATTORNEY

Patented Jan. 13, 1931

1,788,759

UNITED STATES PATENT OFFICE

JASON T. ANDERSON, OF HARRISBURG, OREGON

AUTOMATIC SELF-SERVICING DEVICE FOR MERCANTILE STORES

Application filed June 24, 1929. Serial No. 373,321.

My invention is intended for use in merchandise establishments and particularly in self-servicing merchandise establishments wherein the customer passes through a pre-determined line of travel in his purchasing operation and wherein a conveyor is disposed central of and in the line of travel of the customer, the purpose of the conveyor is to carry a box or basket along the conveyor at will of the shopper as the articles purchased may be placed within a basket or box and be conveyed by the conveyor at the wish of the customer. The conveyor travel being at substantially the same speed of that of the purchaser thereby eliminating the carrying of the articles purchased.

The primary object of my invention is to speed up purchases in a self-servicing store, and to insofar as possible to eliminate undue burdens being placed upon the purchaser during the shopping operation.

A still further object of my invention is to provide service within a self-servicing store that will give the greatest of freedom to the shopper and to eliminate the carrying annoyance to the purchaser during his progress through the store.

And still further objects of my invention is to make available a maximum of merchandise display space within a self-servicing store.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings:

Fig. 2 is a vertical, sectional view, taken on line 2—2 of Fig. 1, looking in the direction indicated, the same is made to illustrate the conveyor mechanism and the shelving associated with the conveyor mechanism.

Fig. 3 is a fragmentary, sectional, end view of the driving mechanism for the conveyor and the elements associated therewith.

Fig. 5 is a perspective, end view of one of the conveyor boxes illustrated as being conveyed around the end portion of the conveyor mechanism.

Like reference characters refer to like parts throughout the several views.

Figure 1:
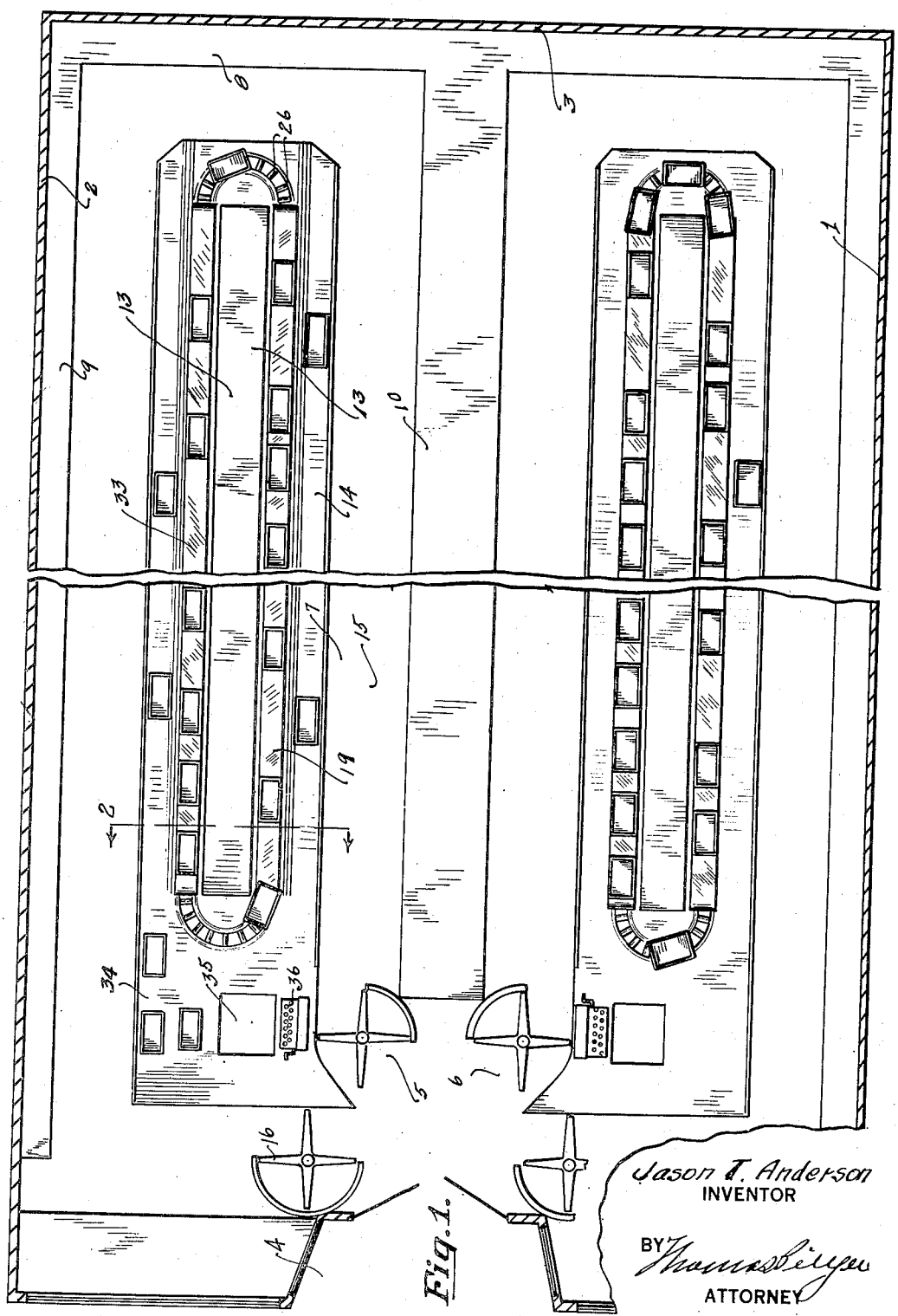
Fig. 1 is a plan view of a duplex self-servicing store.
Figure 4:
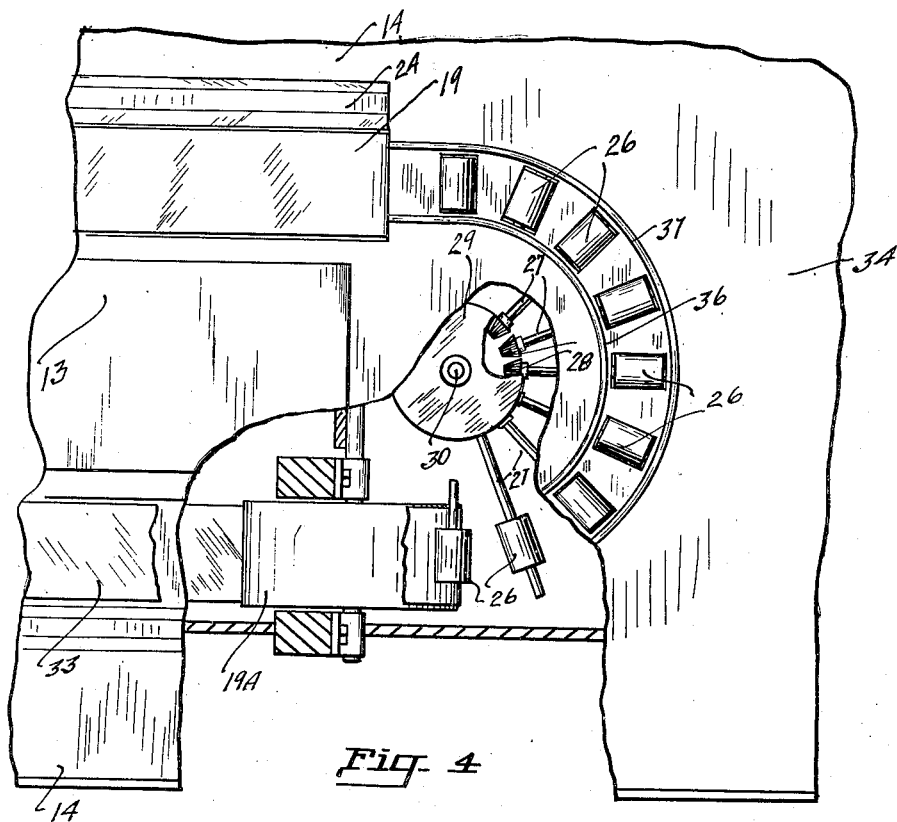
Fig. 4 is a fragmentary, top, plan view of the end section of the conveyor mechanism.
Figure 6:
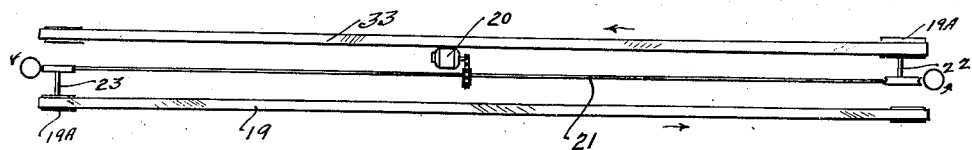
Fig. 6 is a top, plan view of the duplex endless conveyor belts disposed at either side of the central display shelves and illustrating the prime mover for driving the same and the end driving elements for propelling the return end portion of the conveyor, not here shown.

I have illustrated in Fig. 1 a duplex store confined within side walls 1 and 2 and a rear wall 3, and having an entrance 4. The patrons when entering the store may enter either side of the store through turnstiles 5 and 6. Since each of the compartments of the store are similar, I will describe but one of the compartments. A central shelf 7 runs central of the store to be entered. Entrance being had through the turnstile 5. A rear shelf 8 extends across the rear end of the store and a shelf 9 extends adjacent the side walls of the compartment. Central shelvings 10 and 11 run longitudinally and centrally of the store compartments. An endless counter 14 adjacent the central shelving but spaced apart therefrom so that the customer entering the turnstile 5 is passed into an aisle 15 that runs longitudinally of the store and between the adjacent side wall shelving and the central shelf and counter. The customer will emerge from the aisle 15 through the turnstile 16, and will pass the clerk, who will attend to the pricing of the articles purchased and the collecting of payment therefor. The customer on entering the turnstile 5 is given a movable transfer box 17, as illustrated in detail in Fig. 5, the same being made preferably light in construction to facilitate ease in handling. The box is placed upon an endless transfer belt 19, running longitudinally of the central portion of the store. The endless transfer belt 19 is in continuous operation, the same being driven by any suitable prime mover, as by an electric motor 20, illustrated in Fig. 6. The motor 20 is adapted through suitable gear or chain mechanism to drive the shaft 21, and the shaft 21 in turn drives the respective shafts 22 and 23. The customer on entering the store has his transfer box placed upon the transfer belt 19 and the same moves therealong at substantially the rate of purchase travel of the customer and articles may be selected from the respective shelves or bins and be placed within the box. Should the rate of travel of the transfer box 17 be greater than the rate of travel of the purchasing customer, the box may be pulled over the ledge 24 on to the counter 25 and be filled, or articles purchased be placed therein. When it is desired to move on down the aisle, the box may be pushed over the ledge 24 again back on the endless transfer belt 19. Disposed at the end of the room are a series of transfer rollers 26. The transfer rollers being mounted upon driving shafts 27. Bevel pinions 28 disposed upon shaft 27 are in registerable engagement with a master bevel gear 29 that is adapted for being driven from the shaft 21. The bevel gear 29 is secured to the vertical shaft 30 and the vertical shaft 30 has a second bevel gear 31 secured thereto that is driven by the bevel pinion 32 that is secured to the outer end of the motor driven shaft 21. The rolls 26 disposed upon the shaft 27 are shorter in length than the width of the transfer belt 19 in order that the trunnions 18 disposed upon the transfer box 17 may pass between the trunnions disposed upon the oppositely disposed corners of the transfer box 7. The rollers 26 are slightly higher in horizontal surface alignment than the top surface of the transfer belt, in order that the transfer box may be lifted clear of the belt, and the rollers are driven at a speed that will transfer the box at a slightly higher rate of speed than would be accomplished by the belt. The upper surface of the rollers engaging the under side of the box with the trunnion wheels disposed at either side of the box for maintaining the box upon the rollers, as the box is transferred around the end from the transfer belt 19 to the transfer belt 33 disposed upon the oppositely disposed side of the central transfer shelving. Segments of circles 36 and 37 may be placed at either end of the rollers to prevent the trunnion wheels from contacting with the end of the rollers and to train the box about the rollers and maintain the same in trained alignment and position.

Disposed upon the opposite end of the transfer are a similar series of driven rollers. An enlarged counter head 34, is disposed at the delivery end of the transfer unit in order that the clerk disposed within the service well 35, may transfer boxes to and from the customer. A suitable accounting unit, as a cash register 36, is disposed adjacent the service well 35. After the articles have been transferred from the transfer box disposed upon the counter 34, the same may then be placed back upon the transfer unit or stacked for use of future customers. After the purchase has been completed, the customer leaves the store through the turnstile 16.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow.

What I claim is:

1. In a device of the class described, in combination in a store building of shelving disposed along one end and two sides of the room and shelving disposed longitudinally of the room with a passageway disposed between the respective shelving, inlet and exit turnstiles leading into and away from the passageway, a continuous running endless conveyor disposed about the central shelving, a counter disposed between the passageway and the conveyor and shopping boxes adapted to being carried upon the conveyor.

2. In a device of the class described, a store room, an entrance to the store room, shelving disposed across one end and two sides of the room and also longitudinally of the central portion of the room, a continuous running conveyor running around the central shelving, a counter running adjacent the conveyor, a shopping passageway disposed between the side and end shelving and the counter and shopping boxes having trunnion supports adapted for being carried around the conveyor and for being transferred to and from the belt and the counter upon trunnion wheels.

3. In a device of the class described, a store room having shelving disposed at one end and two sides of the room, central shelving disposed longitudinally of the room with a continuous running transfer disposed about the central shelving, a counter surrounding the central shelving and the upper surface of the shelving being substantially in alignment with the upper surface of the transfer and shopping boxes adapted to being transferred by the transfer and for being moved to and from the transfer to the counter.

JASON T. ANDERSON.